(12) United States Patent
Ishino et al.

(10) Patent No.: US 10,413,992 B2
(45) Date of Patent: Sep. 17, 2019

(54) METHOD FOR JOINING STRUCTURAL MATERIAL, JOINING SHEET, AND JOINT STRUCTURE

(71) Applicant: Murata Manufacturing Co., Ltd., Nagaokakyo-shi, Kyoto-fu (JP)

(72) Inventors: Satoshi Ishino, Nagaokakyo (JP); Yoshihiro Kawaguchi, Nagaokakyo (JP); Kosuke Nakano, Nagaokakyo (JP); Hidekiyo Takaoka, Nagaokakyo (JP); Wataru Yanase, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 514 days.

(21) Appl. No.: 15/183,105

(22) Filed: Jun. 15, 2016

(65) Prior Publication Data

US 2016/0297029 A1 Oct. 13, 2016

Related U.S. Application Data

(63) Continuation of application No. PCT/JP2015/050107, filed on Jan. 6, 2015.

(30) Foreign Application Priority Data

Jan. 7, 2014 (JP) .................................. 2014-000959

(51) Int. Cl.
*B23K 31/02* (2006.01)
*B23K 20/02* (2006.01)
(Continued)

(52) U.S. Cl.
CPC .............. *B23K 20/026* (2013.01); *B23K 1/00* (2013.01); *B23K 20/002* (2013.01);
(Continued)

(58) Field of Classification Search
CPC .............. B23K 20/026; B23K 35/3613; B23K 35/302; B23K 20/002; B23K 1/00–206; C21D 9/50
(Continued)

(56) References Cited

U.S. PATENT DOCUMENTS 3,163,499 A * 12/1964 Bray .................. B23K 35/0238
148/536
3,917,149 A * 11/1975 Breton ...................... B22F 3/20
228/124.1
(Continued)

FOREIGN PATENT DOCUMENTS

CN 103168392 A 6/2013
JP 63183772 A 7/1988
(Continued)

OTHER PUBLICATIONS

Machine translation of WO-2014002893-A1 (no date available).*
(Continued)

*Primary Examiner* — Kiley S Stoner
(74) *Attorney, Agent, or Firm* — Arent Fox LLP

(57) ABSTRACT

A first structural material is bonded to a second structural material with a joining material provided with a mixed layer of a raw-material component for forming an intermetallic compound layer and a resin component that softens and flows during heat treatment interposed therebetween to form bonded structural materials. When the bonded structural materials are heat-treated, the first structural material is joined to the second structural material with an intermetallic compound layer, and the resin component exudes and covers the lateral circumferential (exposed) portion of the intermetallic compound layer with a resin film.

10 Claims, 13 Drawing Sheets

(51) Int. Cl.
  *B23K 1/00* (2006.01)
  *B23K 20/00* (2006.01)
  *B23K 35/30* (2006.01)
  *B23K 35/36* (2006.01)
  *C21D 9/50* (2006.01)

(52) U.S. Cl.
  CPC ........ B23K 35/302 (2013.01); B23K 35/3613 (2013.01); C21D 9/50 (2013.01)

(58) Field of Classification Search
  USPC ........ 228/175–176, 248.1–248.5; 148/23–24
  See application file for complete search history.

(56) References Cited

U.S. PATENT DOCUMENTS

| | | | | |
|---|---|---|---|---|
| 4,231,815 | A * | 11/1980 | Snyder | B23K 35/025 |
| | | | | 148/24 |
| 4,431,465 | A * | 2/1984 | Mizuhara | B23K 35/025 |
| | | | | 148/24 |
| 4,981,526 | A * | 1/1991 | Kudo | B23K 35/0244 |
| | | | | 148/22 |
| 5,445,308 | A * | 8/1995 | Nelson | C09J 9/02 |
| | | | | 228/121 |
| 5,972,246 | A * | 10/1999 | Nikaidoh | B23K 35/0244 |
| | | | | 174/257 |
| 6,378,762 | B1 * | 4/2002 | Takeuchi | H05K 3/1233 |
| | | | | 228/180.1 |
| 6,753,094 | B1 | 6/2004 | Wittebrood | |
| 7,849,599 | B2 | 12/2010 | Huff et al. | |
| 9,105,987 | B2 | 8/2015 | Nakano et al. | |
| 9,921,038 | B2 * | 3/2018 | Weinhold | F42B 1/032 |
| 2002/0008228 | A1 * | 1/2002 | Takezawa | H01B 1/22 |
| | | | | 252/513 |
| 2008/0078554 | A1 | 4/2008 | Huff et al. | |
| 2009/0026247 | A1 * | 1/2009 | Sakaguchi | B23K 1/0016 |
| | | | | 228/180.22 |
| 2009/0226701 | A1 * | 9/2009 | Carbone | C09K 5/14 |
| | | | | 428/317.1 |
| 2009/0280023 | A1 * | 11/2009 | Hu | B23K 1/0018 |
| | | | | 420/445 |
| 2012/0161326 | A1 * | 6/2012 | Choi | H01L 21/76898 |
| | | | | 257/772 |
| 2012/0222738 | A1 * | 9/2012 | Oh | H01B 1/22 |
| | | | | 136/256 |
| 2013/0008698 | A1 * | 1/2013 | Himori | H01B 1/22 |
| | | | | 174/251 |
| 2013/0221067 | A1 * | 8/2013 | Lee | H05K 13/046 |
| | | | | 228/1.1 |
| 2013/0233618 | A1 * | 9/2013 | Nakano | B23K 35/025 |
| | | | | 174/94 R |
| 2013/0270001 | A1 | 10/2013 | Nakano et al. | |
| 2014/0079472 | A1 * | 3/2014 | Oppermann | B23K 35/262 |
| | | | | 403/272 |
| 2014/0345939 | A1 * | 11/2014 | Nakano | C22C 9/04 |
| | | | | 174/94 R |
| 2015/0034701 | A1 * | 2/2015 | Takaoka | H01G 4/2325 |
| | | | | 228/101 |
| 2016/0288245 | A1 * | 10/2016 | Ishino | B23K 35/302 |

FOREIGN PATENT DOCUMENTS

| | | |
|---|---|---|
| JP | 2002542044 A | 12/2002 |
| JP | 2004160515 A | 6/2004 |
| JP | 2004308015 A | 11/2004 |
| JP | 2006334625 A | 12/2006 |
| JP | 2008238233 A | 10/2008 |
| JP | 2010065916 A | 3/2010 |
| JP | 201125333 A | 2/2011 |
| JP | 2013243333 A | 12/2013 |
| WO | WO-2014002893 A1 * | 1/2014 ............... C22C 9/05 |
| WO | WO-2015174258 A1 * | 11/2015 ............... B23K 1/00 |

OTHER PUBLICATIONS

International Search Report issued for PCT/JP2014/083708, dated Apr. 14, 2015.
Written Opinion of the International Seaching Authority issued for PCT/JP2015/050107, dated Apr. 14, 2015.

* cited by examiner

10(Cu)

30D

20(Cu)

METHOD FOR JOINING STRUCTURAL MATERIAL, JOINING SHEET, AND JOINT STRUCTURE

CROSS REFERENCE TO RELATED APPLICATIONS

The present application is a continuation of International application No. PCT/JP2015/050107, filed Jan. 6, 2015, which claims priority to Japanese Patent Application No. 2014-000959, filed Jan. 7, 2014, the entire contents of each of which are incorporated herein by reference.

FIELD OF THE INVENTION

The present invention relates to a method for joining structural materials having a large joint surface, a joining sheet and a joint structure which are respectively used for the joining.

BACKGROUND OF THE INVENTION

Soldering, spot welding, or brazing is used for joining structural materials having a large joint surface, such as a heatsink or an automotive body.

Since a solder has properties of gathering in a place where wettability is high during heating and melting, it is difficult to join large joint surfaces together, and there is typically no other choice but to employ joining in the form of spot welding. Further, in the spot welding, from the characteristic of its process, a joint portion exists in the form of dots, and surface joining is difficult. As described above, since both soldering and spot welding become joining in the form of spot, there is a concern that joint strength decreases.

On the other hand, in brazing, surface joining can be implemented since a wax is spread across a joint surface. However, since a joining temperature of brazing is high, there are concerns about deleterious effects such as deformation or embrittlement of surrounding members. The spot welding is similar in that a joining temperature is high, and there are concerns about the same deleterious effects as in brazing. Further, in the spot welding, there is a concern that expensive facilities are required.

Patent Document 1 discloses an alloy joining material capable of being alternative to a high-temperature based solder, and a joining method using the same. In this technique, metal members of Ni, Ag or Al are joined together with an alloy joining material including Te and Ag as main components, and an additive such as Sn or Zn interposed between the metal members, and joined metal members are heat-treated at about 350 to 450° C. Thereby, two metal members are joined together with a joint layer including a Te—Ag alloy and having high heat resistance interposed between the two metal members.

Patent Document 1: JP-A No. 2008-238233

SUMMARY OF THE INVENTION

The joining method described in Patent Document 1 is a technique of joining a relatively small electronic part to a substrate, and joins two metal members together with an alloy joint layer interposed between the metal members. However, in this method, a joining temperature is high, and it is difficult to join the members together in a short time. Further, the above-mentioned alloy joint layer has weak points that are vulnerable to moisture and may be brittle depending on the material used. That is, a joint portion of two members is deteriorated with time and has deteriorating resistance to stress, and the joint portion may be easily destroyed by an external stress.

It is an object of the present invention to provide a method for joining structural materials together in which a high melting point intermetallic compound is produced in a short time at relatively low temperatures to obtain a joint structure with high reliability, a joining material and a joint structure.

A method for joining structural materials together of the present invention includes bonding a first structural material to a second structural material with a joining material provided with a mixed layer of a raw-material component for forming a layer of an intermetallic compound of a low melting point metal and a high melting point metal, and a resin component that softens and flows during heat treatment interposed between the first structural material and the second structural material; and heat-treating the bonded structural materials to cause the first structural material to be joined to the second structural material with the intermetallic compound layer interposed therebetween. During the heating, the resin component is caused to exude and cover the lateral circumferential (exposed) portion of the intermetallic compound layer with a resin film.

A method for joining structural materials together of the present invention includes bonding a first structural material to a second structural material with a joining sheet interposed between the first structural material and the second structural material. The joining sheet contains a raw-material component including at least one high melting point metal powder selected from the group consisting of a Cu—Ni alloy, a Cu—Mn alloy, a Cu—Al alloy and a Cu—Cr alloy, and a low melting point metal powder having Sn as a component or Sn as a main component, and a binder component. The bonded structural materials are heat-treated so that the first structural material is joined to the second structural material with the intermetallic compound layer of the low melting point metal and the high melting point metal interposed therebetween.

A joining sheet of the present invention is one for joining a first structural material to a second structural material with an intermetallic compound layer interposed therebetween. The joining sheet is formed by forming, into a sheet, a mixed layer containing a raw material component including a low melting point metal powder having Sn as a component or Sn as a main component and at least one high melting point metal powder selected from the group consisting of a Cu—Ni alloy, a Cu—Mn alloy, a Cu—Al alloy and a Cu—Cr alloy, and a binder component.

A joint structure of the present invention includes a first structural material joined to a second structural material with an intermetallic compound layer interposed therebetween, and a lateral circumferential (exposed) portion of the intermetallic compound layer is covered with an exudate of a resin component.

In accordance with an aspect of the present invention, since the intermetallic compound layer of the low melting point metal and the high melting point metal is coated with a resin layer, a joint state of the first structural material and the second structural material can be easily stabilized. Further, since a joint layer having a substantially uniform thickness is formed throughout a space between the joint surfaces of the structural materials, the strength of the joint portion can be improved.

DETAILED DESCRIPTION OF THE INVENTION

Hereinafter, a plurality of embodiments for embodying the present invention will be described with reference to the drawings, taking several specific examples. In drawings, like parts are denoted by the same reference symbols. These embodiments are just exemplifications, and it is to be understood that partial replacement or combination of constitutions described in different embodiments can be made. Particularly, in Second Embodiment and subsequent embodiments, descriptions of a matter common to First Embodiment will be omitted, and only different points will be described.

First Embodiment

A method for joining structural materials together, a joining material and a joint structure of a first embodiment will be described in reference to FIG. 1 to FIG. 4.

Figure 1A:
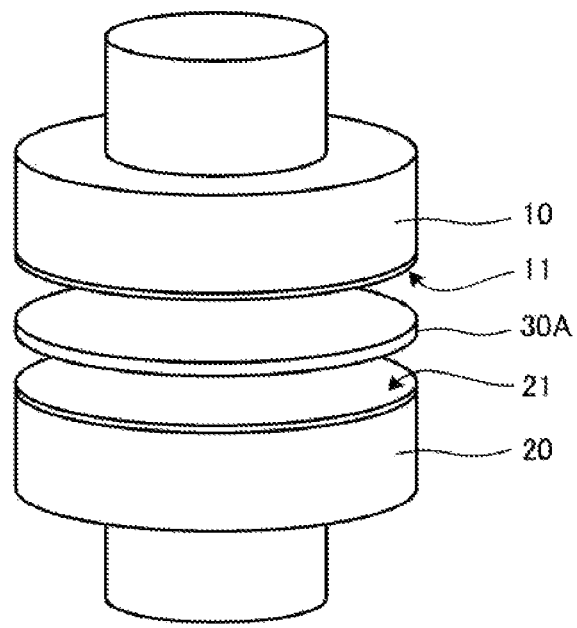
FIG. 1(A) is a perspective view showing a state of a first structural material 10, a second structural material 20 and a joining material 30A before joining thereof.
Figure 1B:
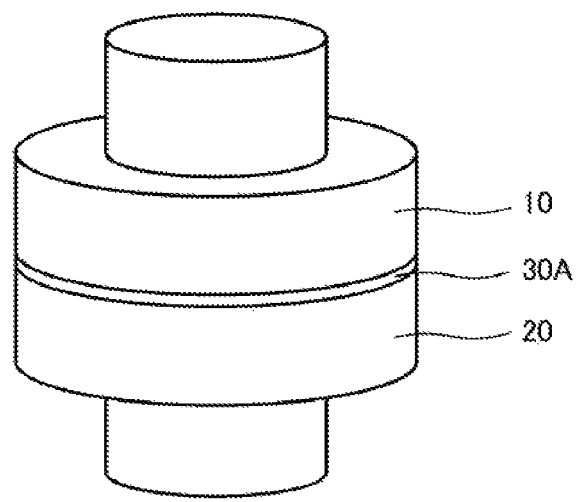
FIG. 1(B) is a perspective view showing a state after joining.
Figure 2A:
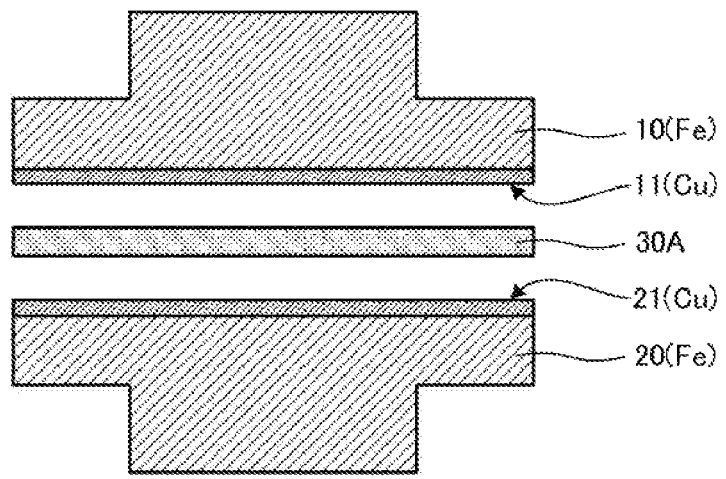
FIG. 2(A) is a sectional view showing a state of the first structural material 10, the second structural material 20 and the joining material 30A before joining thereof.
Figure 2B:
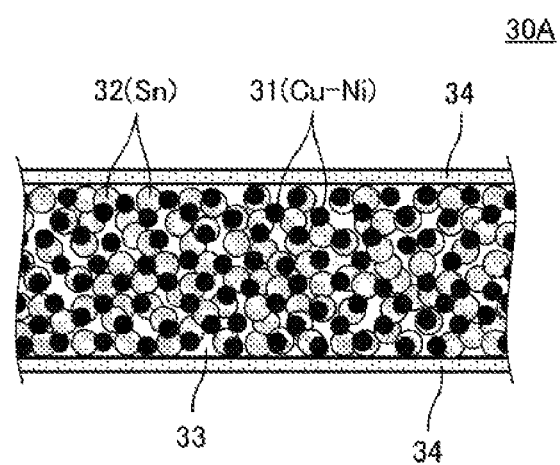
FIG. 2(B) is an enlarged sectional view of the joining material.
Figure 3A:
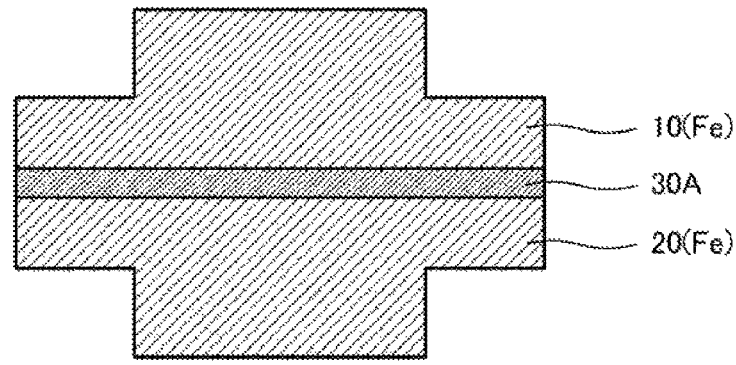
FIG. 3(A) is a sectional view showing a state of the first structural material 10, the second structural material 20 and the joining material 30A after joining thereof.
Figure 3B:
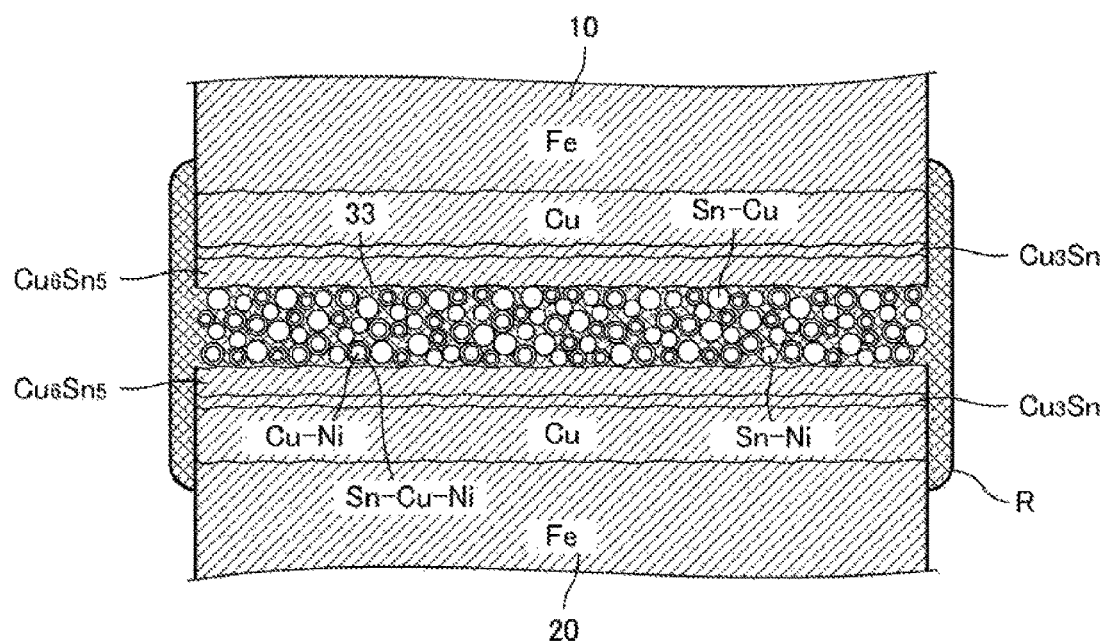
FIG. 3(B) is an enlarged sectional view of a joint portion.

FIG. 1(A) is a perspective view showing a state before joining of a first structural material 10, a second structural material 20 and a joining material 30A to be joined together. FIG. 1(B) is a perspective view showing a state after joining. FIG. 2(A) is a sectional view showing a state before joining of a first structural material 10, a second structural material 20 and a joining material 30A to be joined together. FIG. 2(B) is an enlarged sectional view of the joining material. FIG. 3(A) is a sectional view showing a state after joining of a first structural material 10, a second structural material 20 and a joining material 30A. FIG. 3(B) is an enlarged sectional view of a joint portion.

The structural materials are scaffold materials of, for example, body frames, architectural structure, or machinery and equipment. The first structural material 10 is, for example, a steel material, and a Cu-plating film 11 is formed on a joint surface. Similarly, the second structural material 20 is, for example, a steel material, and a Cu-plating film 21 is formed on a joint surface. An area of the joint surface in each structural material is 1 $cm^2$ or more. In addition, when each structural material is, for example, a steel material, the Cu-plating films 11 and 21 do not need to be formed on a joint surface thereof.

The joining material 30A is a joining sheet provided with a mixed layer of a raw-material component for forming an intermetallic compound layer through transient liquid phase diffusion bonding (hereinafter, referred to as "TLP bonding"), and a resin component that softens and flows during heat treatment. As shown in FIG. 2(B), the raw material component contains a Cu—Ni alloy powder (high melting point metal powder) 31 having particle sizes of, for example, 0.5 to 30 μm, and a Sn powder (low melting point metal powder) 32 having particle sizes of 0.5 to 30 μm.

Specifically, percentages of the Cu—Ni alloy powder and the Sn powder are, for example, (Sn: 55 wt %, Cu—Ni: 45 wt %), (Sn: 70 wt %, Cu—Ni: 30 wt %) and the like. The Cu—Ni alloy powder is, for example, a Cu-10Ni alloy powder. In addition, a shape of the joining material 30A is not limited to a sheet shape, and it may be, for example, a paste form.

The resin component 33 is principally a binder. The binder also serves as a shape-keeping agent for keeping the low melting point metal powder such as Sn and the high melting point alloy powder such as Cu—Ni alloy in a thin sheet form (e.g., thickness: 10 μm to 3 mm) at ordinary temperature. The mixed layer further includes a flux. The mixed layer is formed into a plane form having a uniform thickness, and both surfaces of the mixed layer are covered with an adhesive layer 34. An additive amount of the resin component is preferably 1 parts by weight to 50 parts by weight with respect to 100 parts by weight of the total amount of the low melting point metal powder and the high melting point metal powder.

A method for joining structural materials together using the above-mentioned joining material 30A is as follows.

(1) A Cu-plating film is formed on the surface of the first structural material 10 and the second structural material 20. The Cu-plating film may be formed at least on the joint surface. When the first structural material 10 and the second structural material 20 are structural materials whose surfaces have a Cu-plating film previously formed thereon or when the structural materials themselves are composed of a material including Cu, this Cu-plating step can be omitted.

(2) The joining material 30A is bonded to the surface of the Cu-plating film of the first structural material 10 or the second structural material 20. That is, an adhesive layer 34 on one principal surface side of a joining sheet formed into a sheet form is adhered to the joint surface of the first structural material 10, and an adhesive layer 34 on the other principal surface side is adhered to the joint surface of the second structural material 20.

(3) Thereby, by using adhesion of the adhesive layer 34 of the joining material 30A, the first structural material 10 is temporarily joined to the second structural material 20 with the joining material 30A sandwiched therebetween.

(4) A joint portion between the first structural material 10 and the second structural material 20 (joining material 30A) is heated with hot air using an industrial drier such as a heat gun to allow the Cu—Ni alloy powder 31 which is a high melting point metal to react with the Sn powder 32 which is a low melting point metal to produce a TLP bonding layer Cu—Ni—Sn ($Cu_2NiSn$, etc.) which is a high melting point reactant. That is, an intermetallic compound layer is produced by the TLP bonding reaction, and structural materials are joined together with the intermetallic compound layer interposed between the structural materials. A heating temperature at this time is a melting point of the Sn powder 32 or higher, and a melting point of the Cu—Ni alloy powder 31 or lower, and it is, for example, 250 to 350° C. Further, a heating time is a time at the temperature in which powdery Sn does not remain, and it is, for example, 1 to 10 minutes. The intermetallic compound layer is a high melting point alloy layer whose principal phase is $(Cu, Ni)_6Sn_5$ (melting point: around 435° C.).

The adhesive layer 34 disappears in the above-mentioned heating step or is integrated with the resin component 33. The flux component disappears in the above-mentioned heating step. The flux component is a reducing agent, and allows an oxide films on the surfaces of the powders to dissolve to accelerate the above-mentioned reaction. In addition, it is preferred that the flux is also contained in the adhesive layer 34. Thereby, the surfaces (Cu-plating films 11, 21) of the first structural material 10 and the second structural material 20 can be made clean and oxide films of the powder surfaces can be removed, and therefore a more compact intermetallic compound layer can be formed, and a reaction rate is more improved.

At the micro level, as shown in FIG. 3(B), the Cu—Ni alloy powder reacts with the Sn powder to form a $Cu_3Sn$ layer and a $Cu_6Sn_5$ layer on the Cu-plating film. A Sn—Cu—Ni film is formed on the surface of the Cu—Ni alloy powder by the reaction of the Cu—Ni alloy powder with Sn. Further, a Sn—Cu alloy ($Cu_6Sn_5$, etc.) is produced by the reaction of the Sn powder with Cu. Moreover, a Sn—Ni alloy ($Ni_3Sn_4$, etc.) is also produced by the reaction of the Sn powder with Ni.

Minute open pores are formed in the resulting intermetallic compound layer, and the resin component 33 is filled into the minute open pores. Further, the resin component softens and flows by heat treatment to exude to a lateral circumferential portion of the joint portion, and consequently the lateral circumferential portion of the intermetallic compound layer is covered with a film made of the resin component.

Since the intermetallic compound layer is thus formed, the melting point of the intermetallic compound layer changes to, for example, 400° C. or higher. In addition, it is preferred that Sn does not remain; however, in the case where Sn remains in the intermetallic compound layer, high joint strength and heat resistance at 400° C. can be secured even though about 10 to 20 wt % of elemental Sn remains in the intermetallic compound layer.

The resin component 33 also serves as a binder and is a liquid or granular resin, its softening temperature/flow beginning temperature is 130 to 300° C., and specific examples thereof include a phenolic resin, an epoxy resin, a silicone resin, an acrylic resin, a polycarbonate resin, a polyamide resin, a polyimide resin, Teflon (registered trademark) resin and the like. In the mixed phase, a flux component may be contained in an amount of 50 to 200 parts by weight with respect to 100 parts by weight of the resin component. During heat treatment, the resin component 33 softens and flows according to the TLP bonding reaction of the high melting point metal powder with the low melting point metal powder and is extruded outward, and consequently a resin film R which is an exudate of the resin component 33 is formed on a lateral circumferential (exposed) portion of the intermetallic compound layer. The lateral circumferential (exposed) portion of the intermetallic compound layer, and further a joint interface between the first structural material and the intermetallic compound layer and a joint interface between the second structural material and the intermetallic compound layer are covered with the resin film R. The resin film R is a uniform film having a thickness of about 0.1 to 0.5 mm, and is firmly fixed to the joint interface between the intermetallic compound layer and each structural material. Further, a resin component which minute open pores of the intermetallic compound layer have been filled with is combined with a resin component having exuded to the lateral circumferential portion of the intermetallic compound layer to form a robust protective film by the resin component.

As described above, while spot welding is commonly used for joining of structural members constituting a body frame, it is welding in the form of spot (fragment), and therefore there are limitations to enhance rigidity of the body frame. If the joint portion is formed by surface joining, rigidity can be increased, but a welding process becomes heavyweight and production efficiency is low. On the other hand, in accordance with the present embodiment, since a sheet-like joining material having special composition as described above is used, structural members can be easily joined together by surface joining. Particularly, a Cu—Ni—Sn-based intermetallic compound is harder than a common high-strength steel plate as a body frame material, and therefore the Cu—Ni—Sn-based intermetallic compound can enhance the rigidity of the body frame compared with merely spot welding (furthermore welding by surface joining). In addition, although a technique of using a solder sheet is conceivable, the solder becomes so-called "lumps" (becomes a ball) by heating, and therefore surface joining cannot be implemented.

Further, in accordance with the present embodiment, since the intermetallic compound layer of the low melting point metal and the high melting point metal, which is a TLP joint layer, is coated with a resin layer, a joint state of the first structural material and the second structural material can be easily stabilized, and the strength of the joint portion and environment resistance can be improved. Particularly, since the low melting point metal of a raw material component is Sn and the high melting point metal of a raw material component is a Cu—Ni alloy, the high melting point reactant (intermetallic compound) is formed in a short time at low temperatures to obtain a joint structure having high heat resistance. Further, even when voids or pores are present in the TLP bonding layer, since an external surface of the TLP bonding layer is covered with a resin film, strength or environment resistance of the joint portion is hardly significantly deteriorated. Moreover, in this joining method, since a joining material does not become a ball as distinct from a Sn—Ag—Cu solder, a joint layer having a substantially uniform thickness is formed throughout a space between the joint surfaces of the structural materials, and therefore joint strength can be significantly improved.

Figure 4A:
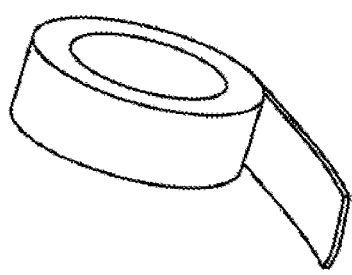
FIG. 4(A) is a perspective view of a structural material joining tape.
Figure 4B:
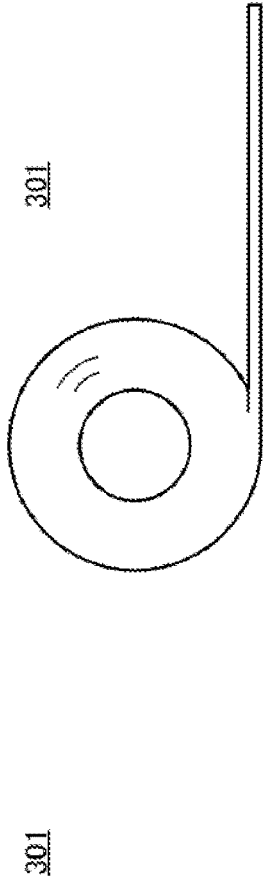
FIG. 4(B) is a front view thereof.
Figure 4C:
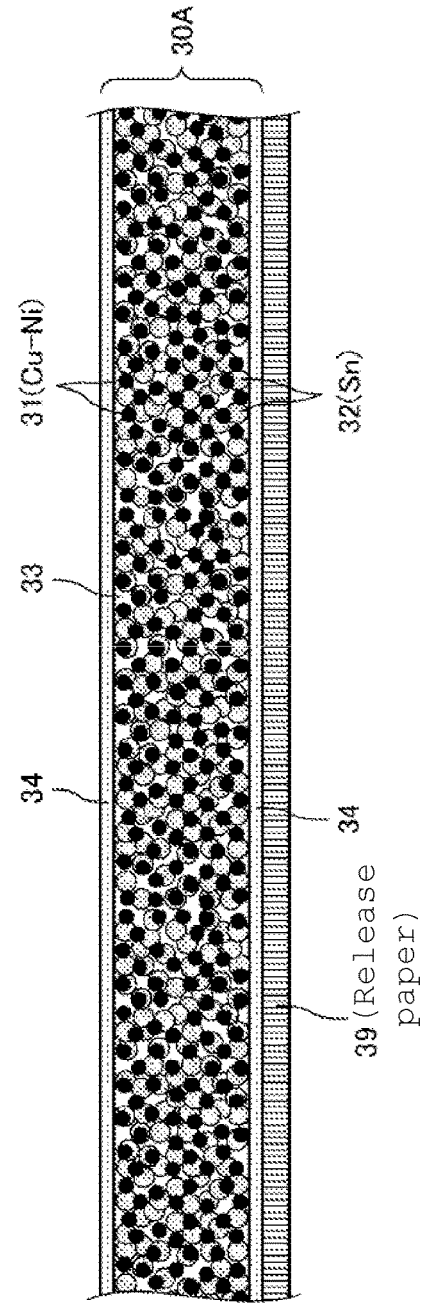
FIG. 4(C) is a partially enlarged sectional view.

FIG. 4(A) is a perspective view of a structural material joining tape, FIG. 4(B) is a front view thereof, and FIG. 4(C) is a partially enlarged sectional view.

As shown in FIG. 4(C), the joining tape 301 is one in which a release paper 39 is bonded to one surface of the joining material 30A. That is, the joining tape 301 is one in which a joining sheet is formed into a tape configuration. The configuration of the joining material 30A is as is shown in FIG. 2(B).

The joining tape 301 can be supplied in the form of a roll as shown in FIGS. 4(A) and 4(B) since each layer of the tape is flexible.

In addition, as the low melting point metal powder, a powder having Sn as a main component can be used in addition to the above-mentioned Sn powder. Further, as the high melting point metal powder, a powder of one alloy or a plurality of alloys selected from the group consisting of a Cu—Ni alloy, a Cu—Mn alloy, a Cu—Al alloy and a Cu—Cr alloy can be used in addition to the above-mentioned Cu—Ni alloy powder.

As the flux in the resin component 33, an organic acid having a carboxyl group, such as adipic acid and gluconic acid, can be used. As the binder, rosin can be used.

As the adhesive layer 34, an adhesive agent or the like can be used which is predominantly composed of one, or two or more of an acrylic, a silicone-based, a natural rubber-based, a synthetic rubber-based, and a vinyl ether-based polymers, and in which as required, a crosslinking agent, a tackifier, a softening agent, a plasticizer, or an antioxidant is mixed.

Second Embodiment

A method for joining structural materials together, a joining material and a joint structure of a second embodiment will be described in reference with FIG. 5 and FIG. 6.

Figure 5A:
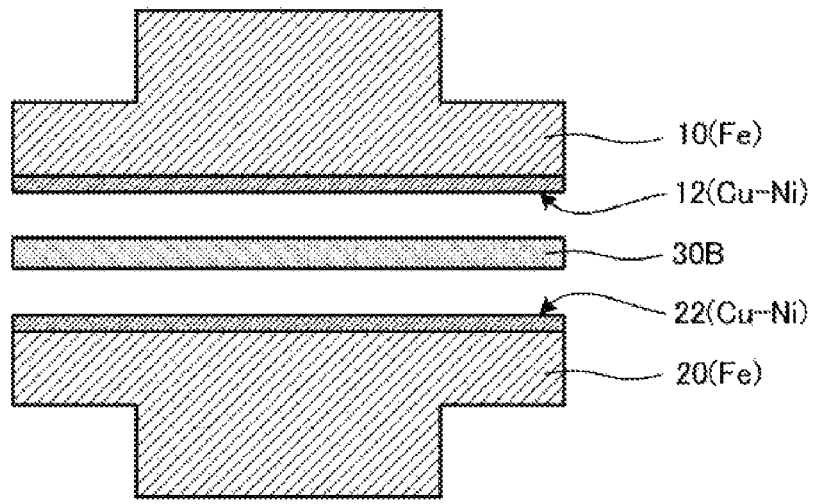
FIG. 5(A) is a sectional view showing a state of the first structural material 10, the second structural material 20 and the joining material 30B before joining thereof.
Figure 5B:
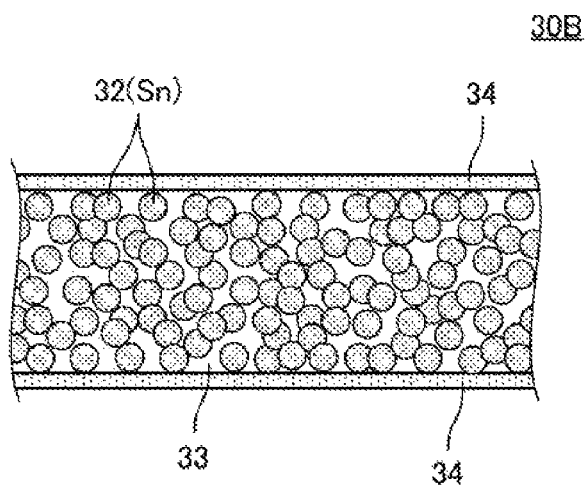
FIG. 5(B) is an enlarged sectional view of the joining material.
Figure 6A:
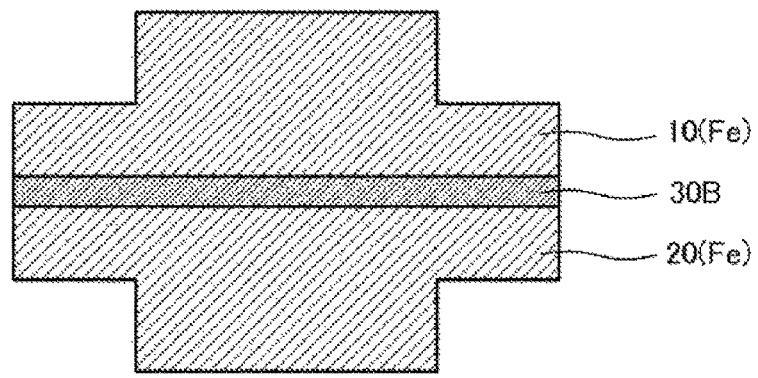
FIG. 6(A) is a sectional view showing a state of the first structural material 10, the second structural material 20 and the joining material 30B after joining thereof.
Figure 6B:
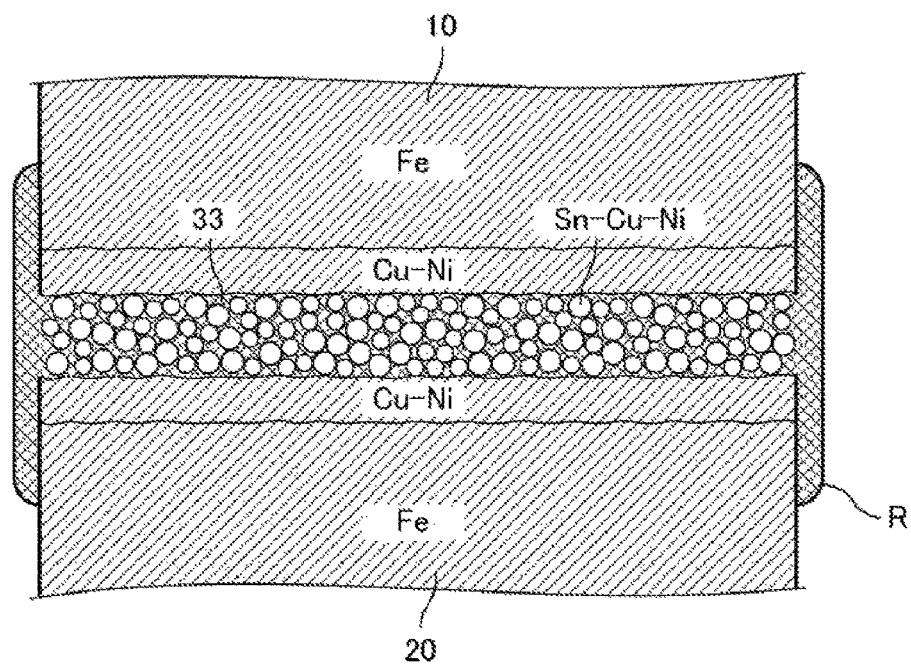
FIG. 6(B) is an enlarged sectional view of a joint portion.

FIG. 5(A) is a sectional view showing a state before joining of a first structural material 10, a second structural material 20 and a joining material 30B to be joined together. FIG. 5(B) is an enlarged sectional view of the joining material. FIG. 6(A) is a sectional view showing a state after joining of a first structural material 10, a second structural material 20 and a joining material 30B. FIG. 6(B) is an enlarged sectional view of a joint portion.

The first structural material 10 is, for example, a steel material, and a plating film 12 of a Cu—Ni alloy which is a high melting point metal is formed on a joint surface. Similarly, the second structural material 20 is, for example, a steel material, and a plating film of a Cu—Ni alloy 22 is formed on a joint surface. In addition, when each structural material is, for example, a Cu—Ni alloy material, the plating film of a Cu—Ni alloy does not need to be formed on a joint surface thereof.

The joining material 30B is a joining sheet provided with a mixed layer of a raw-material component for forming an intermetallic compound layer through TLP joining, and a resin component that softens and flows during heat treatment. As shown in FIG. 5(B), the raw material component contains a Sn powder 32. In addition, a shape of the joining material 30B is not limited to a sheet shape, and it may be, for example, a paste form. The resin component 33 is principally a binder. The mixed layer further includes a flux. The mixed layer is formed into a plane form having a uniform thickness, and both surfaces of the mixed layer are covered with an adhesive layer 34.

A method for joining structural materials together using the above-mentioned joining material 30B is as follows.

(1) A plating film of a Cu—Ni alloy is formed on the surface of the first structural material 10 and the second structural material 20. The plating film of a Cu—Ni alloy may be formed at least on the joint surface. When the first structural material 10 and the second structural material 20 are structural materials whose surfaces have a plating film of a Cu—Ni alloy previously formed thereon or when the structural materials themselves are composed of a material including a Cu—Ni alloy, this Cu—Ni alloy plating step can be omitted.

(2) The joining material 30B is bonded to the surface of the plating film of a Cu—Ni alloy of the first structural material 10 or the second structural material 20. That is, an adhesive layer 34 on one principal surface side of a joining sheet formed into a sheet form is adhered to the joint surface of the first structural material 10, and an adhesive layer 34 on the other principal surface side is adhered to the joint surface of the second structural material 10.

(3) Thereby, by using adhesion of the adhesive layer 34 of the joining material 30B, the first structural material 10 is temporarily joined to the second structural material 20 with the joining material 30B sandwiched therebetween.

(4) A joint portion between the first structural material 10 and the second structural material 20 (joining material 30B) is heated using an industrial drier such as a heat gun to allow the plating film of a Cu—Ni alloy which is a high melting point metal to react with the Sn powder 32 which is a low melting point metal powder to produce a TLP bonding layer (Cu—Ni—Sn) which is a high melting point reactant. That is, an intermetallic compound layer is produced by the TLP bonding reaction, and structural materials are joined together with the intermetallic compound layer interposed between the structural materials.

As shown in FIG. 6(B), the plating film of a Cu—Ni alloy reacts with the Sn powder to form a Sn—Cu—Ni alloy.

The adhesive layer 34 disappears in the above-mentioned heating step or is integrated with the resin component 33.

The flux component disappears in the above-mentioned heating step. The flux component is a reducing agent, and allows an oxide films on the surfaces of the powders to dissolve to accelerate the above-mentioned reaction. In addition, it is preferred that the flux is also contained in the adhesive layer 34. Thereby, the surfaces (plating films of a Cu—Ni alloy 12, 22) of the first structural material 10 and the second structural material 20 can be made clean and oxide films of the powder surfaces can be removed, and therefore a more compact intermetallic compound layer can be formed, and a reaction rate is more improved.

Minute open pores are formed in the resulting intermetallic compound layer, and the resin component 33 is filled into the minute open pores. Further, the resin component softens and flows by heat treatment to exude to a lateral circumferential portion of the joint portion, and consequently the lateral circumferential portion of the intermetallic compound layer is covered with a film made of the resin component.

As with First Embodiment, in accordance with the present embodiment, since a sheet-like joining member having special composition as described above is used, structural members can be easily joined together by surface joining. Particularly, a Cu—Ni—Sn-based intermetallic compound is harder than a common high-strength steel plate as a body frame material, and therefore the Cu—Ni—Sn-based intermetallic compound can enhance the rigidity of the body frame compared with merely spot welding (furthermore welding by surface joining).

Further, since the intermetallic compound layer of a TLP joint layer is coated with a resin layer, a joint state of the first structural material and the second structural material can be easily stabilized, and the strength of the joint portion can be improved. Particularly, since the low melting point metal of a raw material component is Sn and the high melting point metal of a raw material component is a Cu—Ni alloy, the high melting point reactant (intermetallic compound) is formed in a short time at low temperatures to obtain a joint structure having high heat resistance. Moreover, in this joining method, a joint layer having a substantially uniform thickness is formed throughout a space between the joint surfaces of the structural materials, and therefore joint strength can be significantly improved.

In addition, in order to form a Cu—Ni—Sn alloy of the TLP bonding layer and not to leave a layer of Sn alone, a thickness of the joining material 30B, thicknesses of the plating films of a Cu—Ni alloy 12 and 22, and ratio of the thickness are defined. For example, when a volumetric content of a metal powder component of the joining material 30B is 50%, the thicknesses of the plating films of a Cu—Ni alloy 12 and 22 are set to about 0.05 to 0.20 relative to the thickness of the joining material 30B.

In addition, a Cu-Mu-Sn alloy layer, a Cu—Al—Sn alloy layer, or a Cu—Cr—Sn alloy layer may be formed in the TLP bonding layer by forming a film of Cu—Mn alloy plating, Cu—Al alloy plating or Cu—Cr alloy plating in place of Cu—Ni alloy plating.

Third Embodiment

A method for joining structural materials together, a joining material and a joint structure of a third embodiment will be described in reference with FIG. 7 and FIG. 8.

Figure 7A:
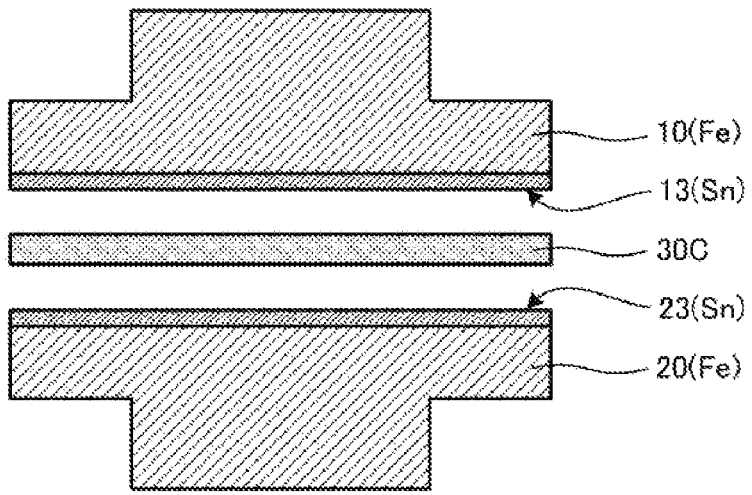
FIG. 7(A) is a sectional view showing a state of the first structural material 10, the second structural material 20 and the joining material 30C before joining thereof.
Figure 7B:
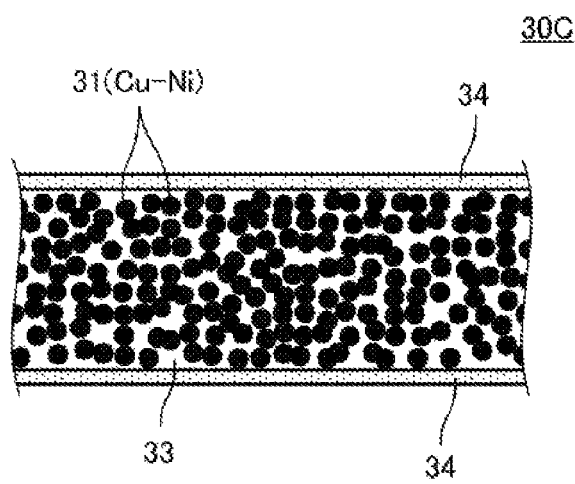
FIG. 7(B) is an enlarged sectional view of the joining material.
Figure 8A:
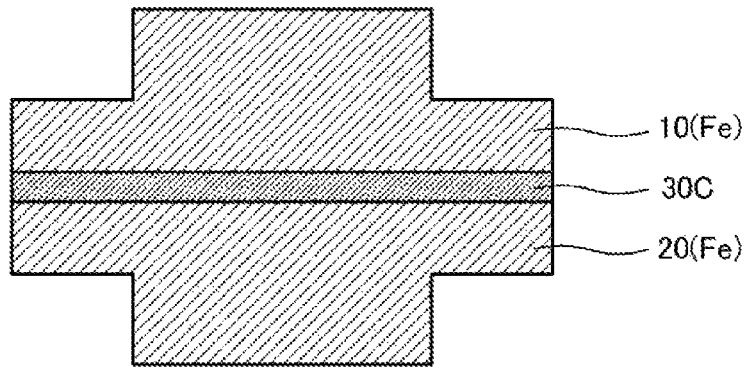
FIG. 8(A) is a sectional view showing a state of the first structural material 10, the second structural material 20 and the joining material 30C after joining thereof.
Figure 8B:
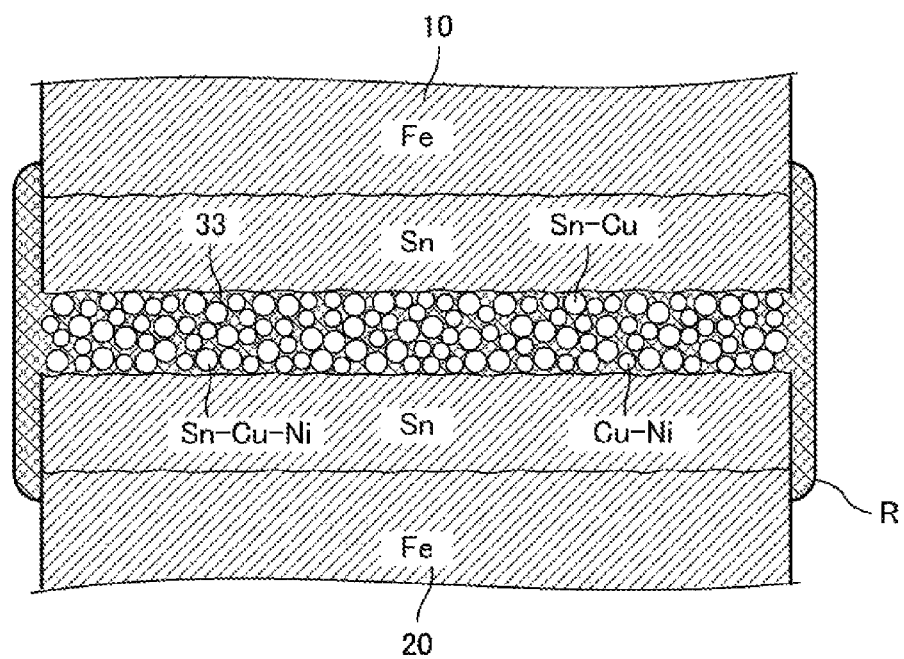
FIG. 8(B) is an enlarged sectional view of a joint portion.

FIG. 7(A) is a sectional view showing a state before joining of a first structural material 10, a second structural material 20 and a joining material 30C to be joined together. FIG. 7(B) is an enlarged sectional view of the joining material. FIG. 8(A) is a sectional view showing a state after joining of a first structural material 10, a second structural material 20 and a joining material 30C. FIG. 8(B) is an enlarged sectional view of a joint portion.

The first structural material 10 is, for example, a steel material, and a Sn-plating film 13 which is a low melting point metal is formed on a joint surface. Similarly, the second structural material 20 is, for example, a steel material, and a Sn-plating film 23 is formed on a joint surface. In addition, when each structural material is, for example, a Sn material, the Sn-plating films 13 and 23 do not need to be formed on a joint surface thereof.

The joining material 30C is a joining sheet provided with a mixed layer of a raw-material component for forming an intermetallic compound layer through TLP joining, and a resin component that softens and flows during heat treatment. As shown in FIG. 7(B), the raw material component contains a Cu—Ni alloy powder 31 which is a high melting point metal powder. In addition, a shape of the joining material 30C is not limited to a sheet shape, and it may be, for example, a paste form. The resin component 33 is principally a binder. The mixed layer further includes a flux. The mixed layer is formed into a plane form having a uniform thickness, and both surfaces of the mixed layer are covered with an adhesive layer 34.

A method for joining structural materials together using the above-mentioned joining material 30C is as follows.

(1) A Sn-plating film is formed on the surface of the first structural material 10 and the second structural material 20. The Sn-plating film may be formed at least on the joint surface. When the first structural material 10 and the second structural material 20 are structural materials whose surfaces have a Sn-plating film previously formed thereon or when the structural materials themselves are composed of a material including Sn, this Sn-plating step can be omitted.

(2) The joining material 30C is bonded to the surface of the Sn-plating film 13 of the first structural material 10 or the surface of the Sn-plating film 23 the second structural material 20. That is, an adhesive layer 34 on one principal surface side of a joining sheet formed into a sheet form is adhered to the joint surface of the first structural material 10, and an adhesive layer 34 on the other principal surface side is adhered to the joint surface of the second structural material 20.

(3) Thereby, by using adhesion of the adhesive layer 34 of the joining material 30C, the first structural material 10 is temporarily joined to the second structural material 20 with the joining material 30C sandwiched therebetween.

(4) A joint portion between the first structural material 10 and the second structural material 20 (joining material 30C) is heated using an industrial drier such as a heat gun to allow the Sn-plating film which is a low melting point metal to react with the Cu—Ni alloy powder 31 to produce a TLP bonding layer (Cu—Ni—Sn) which is a high melting point reactant. That is, an intermetallic compound layer is produced by the TLP bonding reaction, and structural materials are joined together with the intermetallic compound layer interposed between the structural materials. A heating temperature at this time is a melting point of the Sn-plating films 13, 23 or higher, and a melting point of the Cu—Ni alloy powder 31 or lower, and it is, for example, 250 to 350° C. Further, a heating temperature is a temperature in the condition in which Sn does not remain singly, and it is, for example, 1 to 10 minutes.

As shown in FIG. 8(B), the Sn-plating film reacts with the Cu—Ni alloy powder to form a Sn—Cu—Ni. Further, Sn—Cu is partially formed.

The adhesive layer 34 disappears in the above-mentioned heating step or is integrated with the resin component 33. The flux component disappears in the above-mentioned heating step. The flux component is a reducing agent, and allows an oxide films on the surfaces of the powders to dissolve to accelerate the above-mentioned reaction. In addition, it is preferred that the flux is also contained in the adhesive layer 34. Thereby, the surfaces (Sn-plating films 13, 23) of the first structural material 10 and the second structural material 20 can be made clean and oxide films of the powder surfaces can be removed, and therefore a more compact intermetallic compound layer can be formed, and a reaction rate is more improved.

Minute open pores are formed in the resulting intermetallic compound layer, and the resin component 33 is filled into the minute open pores. Further, the resin component softens and flows by heat treatment to exude to a lateral circumferential portion of the joint portion, and consequently the lateral circumferential portion of the intermetallic compound layer is covered with a film made of the resin component.

Since the intermetallic compound layer is thus formed, the melting point of the intermetallic compound layer changes to, for example, 400° C. or higher.

The resin component 33 is going to be extruded outward according to the TLP bonding reaction of the high melting point metal powder with the low melting point metal powder, and consequently a resin film R is formed on a lateral circumferential (exposed) portion of the intermetallic compound layer. The lateral circumferential (exposed) portion of the intermetallic compound layer is covered with the resin film R. Further, a resin component which minute open pores of the intermetallic compound layer have been filled with is combined with a resin component having exuded to the lateral circumferential portion of the intermetallic compound layer to form a robust protective film by the resin component.

As with First Embodiment, in accordance with the present embodiment, since a sheet-like joining material having special composition as described above is used, structural members can be easily joined together by surface joining. Particularly, a Cu—Ni—Sn-based intermetallic compound is harder than a common high-strength steel plate as a body frame material, and therefore the Cu—Ni—Sn-based intermetallic compound can enhance the rigidity of the body frame compared with merely spot welding (furthermore welding by surface joining).

Further, since the intermetallic compound layer of a TLP joint layer is coated with a resin layer, a joint state of the first structural material and the second structural material can be easily stabilized, and the strength of the joint portion can be improved. Particularly, since the low melting point metal of a raw material component is Sn and the high melting point metal of a raw material component is a Cu—Ni alloy, the high melting point reactant (intermetallic compound) is formed in a short time at low temperatures to obtain a joint structure having high heat resistance. Moreover, in this joining method, a joint layer having a substantially uniform thickness is formed throughout a space between the joint surfaces of the structural materials, and therefore joint strength can be significantly improved.

In addition, in order not to leave a layer of Cu—Ni alone in the joining material 30C, a thickness of the joining material 30C, thicknesses of the Sn-plating films 13 and 23, and ratio of the thickness are defined. For example, when a volumetric content of a metal powder component of the joining material 30C is 50%, thicknesses of the Sn-plating films 13 and 23 are set to about 0.30 to 0.60 relative to the thickness of the joining material 30C.

In addition, when the first structural material and the second structural material are a Sn material, the above-mentioned (1) step of forming a Sn-plating film is unnecessary, and it is required only to perform processing from the above-mentioned (2).

Fourth Embodiment

A method for joining structural materials together, a joining material and a joint structure of a fourth embodiment will be described in reference with FIG. 9 and FIG. 10.

Figure 9A:
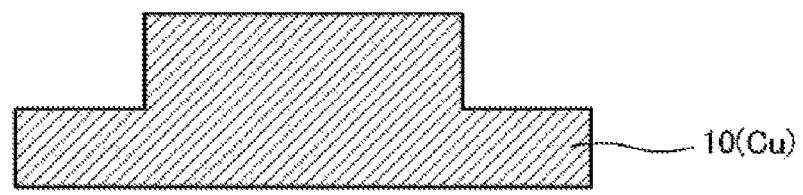
FIG. 9(A) is a sectional view showing a state of the first structural material 10, the second structural material 20 and the joining material 30D before joining thereof.
Figure 9A:
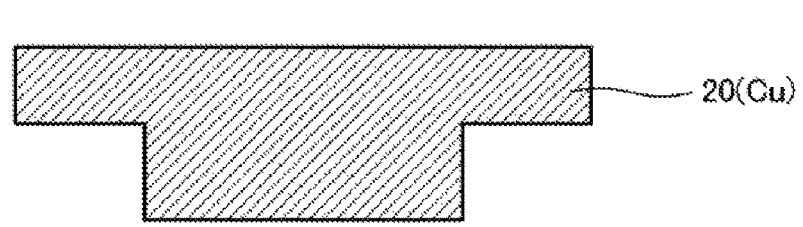
Figure 9B:
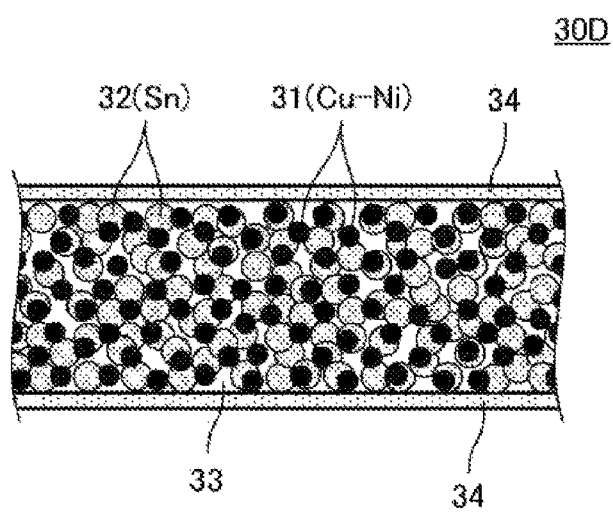
FIG. 9(B) is an enlarged sectional view of the joining material.
Figure 10A:
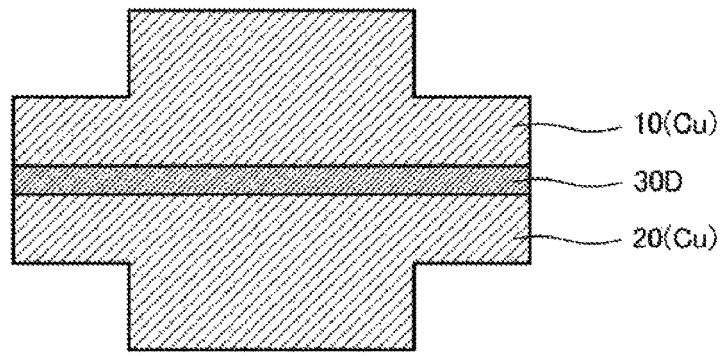
FIG. 10(A) is a sectional view showing a state of the first structural material 10, the second structural material 20 and the joining material 30D after joining thereof.
Figure 10B:
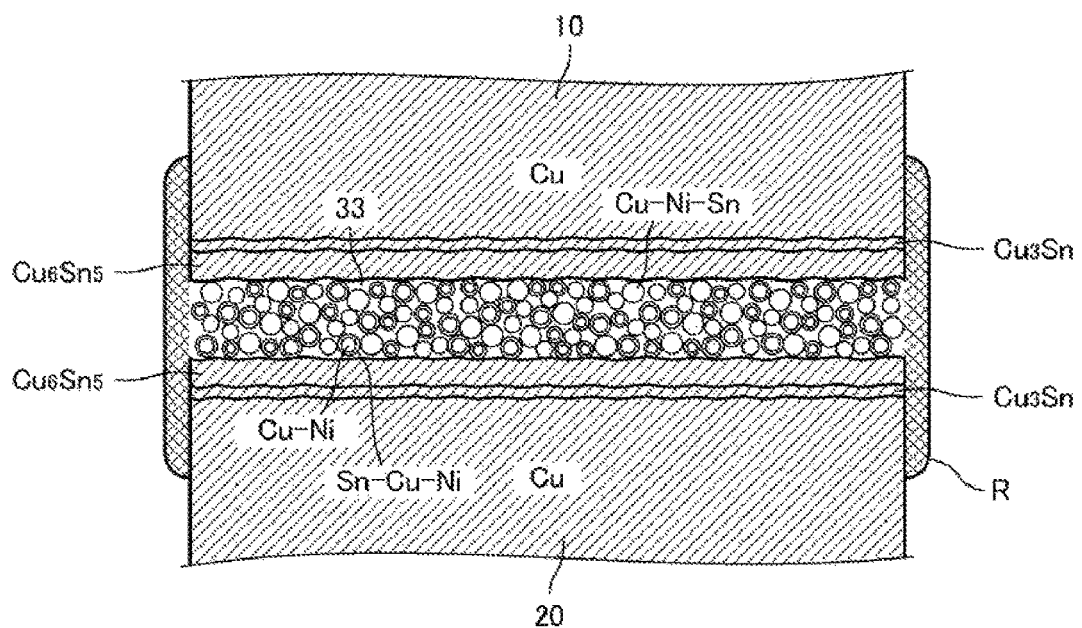
FIG. 10(B) is an enlarged sectional view of a joint portion.
Figure 11A:
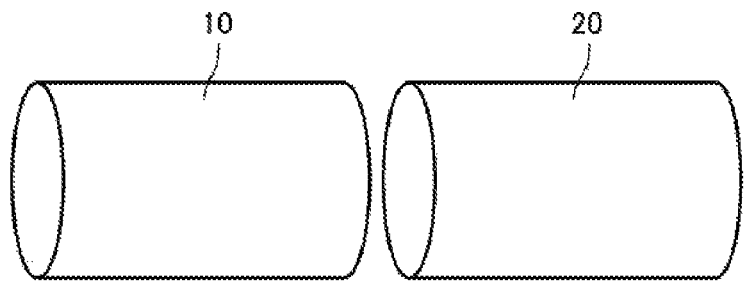
FIG. 11(A) to FIG. 11(D) are perspective views showing a step of joining the first structural material 10 and the second structural material 20 together by a structural material joining tape 305.
Figure 11B:
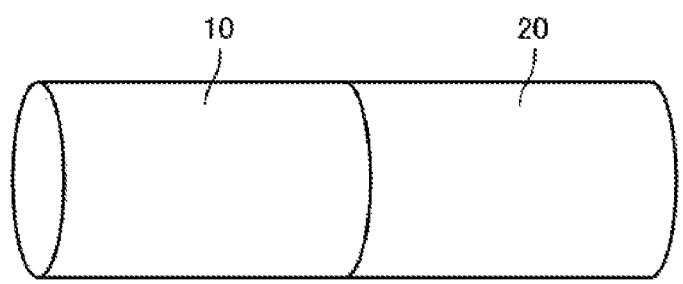
Figure 11C:
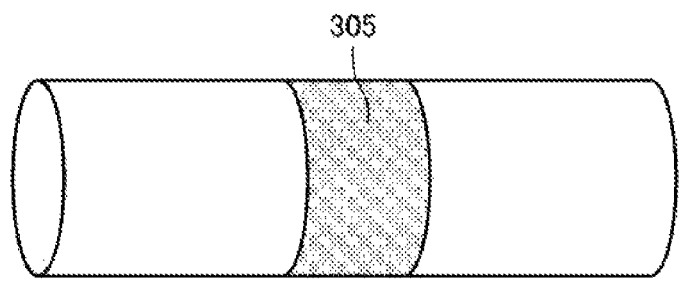
Figure 11D:
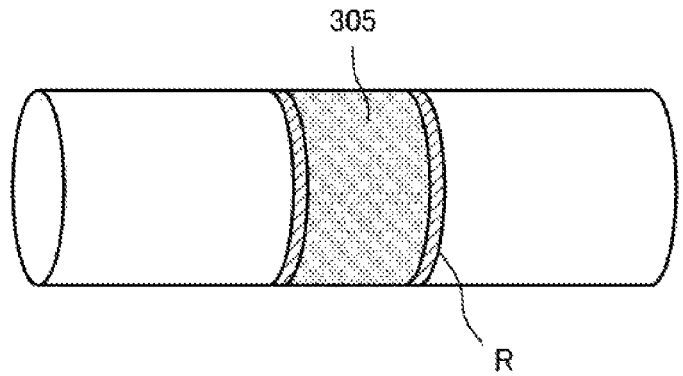

FIG. 9(A) is a sectional view showing a state before joining of a first structural material 10, a second structural material 20 and a joining material 30D to be joined together. FIG. 9(B) is an enlarged sectional view of the joining material. FIG. 10(A) is a sectional view showing a state after joining of a first structural material 10, a second structural material 20 and a joining material 30D. FIG. 10(B) is an enlarged sectional view of a joint portion.

The first structural material 10 and the second structural material 20 are both a copper (Cu) material.

The joining material 30D is a joining sheet provided with a mixed layer of a raw-material component for forming an intermetallic compound layer through TLP joining, and a resin component that softens and flows during heat treatment. As shown in FIG. 9(B), the raw material component contains a Cu—Ni alloy powder 31 and a Sn powder 32. In addition, a shape of the joining material 30D is not limited to a sheet shape, and it may be, for example, a paste form. The resin component 33 is principally a binder. The mixed layer further includes a flux. The mixed layer is formed into a plane form having a uniform thickness, and both surfaces of the mixed layer are covered with an adhesive layer 34.

A method for joining structural materials together using the above-mentioned joining material 30D is as follows.

(1) The joining material 30D is bonded to the joint surface of the first structural material 10 or the second structural material 20. That is, an adhesive layer 34 on one principal surface side of a joining sheet formed into a sheet form is adhered to the joint surface of the first structural material 10, and an adhesive layer 34 on the other principal surface side is adhered to the joint surface of the second structural material 20.

(2) Thereby, by using adhesion of the adhesive layer 34 of the joining material 30D, the first structural material 10 is temporarily joined to the second structural material 20 with the joining material 30D sandwiched therebetween.

(3) A joint portion between the first structural material 10 and the second structural material 20 (joining material 30D) is heated using an industrial drier such as a heat gun to allow the Sn powder to react with the Cu—Ni alloy powder to produce a TLP bonding layer (Cu—Ni—Sn) which is a high melting point reactant. That is, an intermetallic compound layer is produced by the TLP bonding reaction, and structural materials are joined together with the intermetallic compound layer interposed between the structural materials.

The adhesive layer 34 disappears in the above-mentioned heating step or is integrated with the resin component 33.

The flux component disappears in the above-mentioned heating step. The flux component is a reducing agent, and allows an oxide films on the surfaces of the powders to dissolve to accelerate the above-mentioned reaction. In addition, it is preferred that the flux is also contained in the adhesive layer 34. Thereby, the surfaces of the first structural material 10 and the second structural material 20 can be made clean and oxide films of the powder surfaces can be removed, and therefore a more compact intermetallic compound layer can be formed, and a reaction rate is more improved.

At the micro level, as shown in FIG. 10(B), the Cu—Ni alloy powder reacts with the Sn powder to form a $Cu_3Sn$ layer and a $Cu_6Sn_5$ layer on the surface of the Cu material. A Sn—Cu—Ni film is formed on the surface of the Cu—Ni alloy powder by the reaction of the Cu—Ni alloy powder with Sn. Moreover, Cu—Ni—Sn is also formed.

Minute open pores are formed in the resulting intermetallic compound layer, and the resin component 33 is filled into the minute open pores. Further, the resin component softens and flows by heat treatment to exude to a lateral circumferential portion of the joint portion, and consequently the lateral circumferential portion of the intermetallic compound layer is covered with a film made of the resin component.

Since the intermetallic compound layer is thus formed, the melting point changes to, for example, 400° C. or higher.

The resin component 33 is going to be extruded outward according to the TLP bonding reaction of the high melting point metal powder with the low melting point metal powder, and consequently a resin film R is formed on a lateral circumferential (exposed) portion of the intermetallic compound layer. The lateral circumferential (exposed) portion of the intermetallic compound layer is covered with the resin film R. Further, a resin component which minute open pores of the intermetallic compound layer have been filled with is combined with a resin component having exuded to the lateral circumferential portion of the intermetallic compound layer to form a robust protective film by the resin component.

Fifth Embodiment

A method for joining structural materials together, a joining material and a joint structure of a fifth embodiment will be described in reference with FIG. 11 to FIG. 13.

Figure 12A:
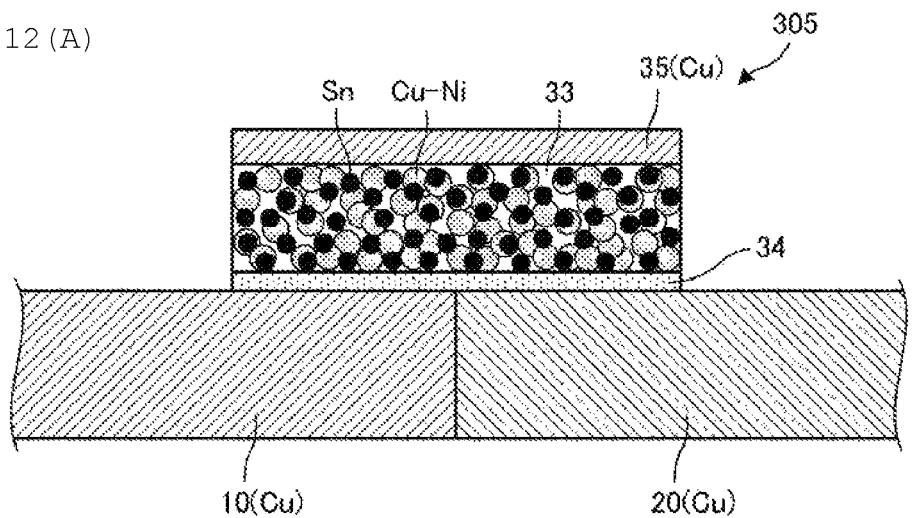
FIG. 12(A) is an enlarged sectional view of a joint portion in a state shown in FIG. 11(C).
Figure 12B:
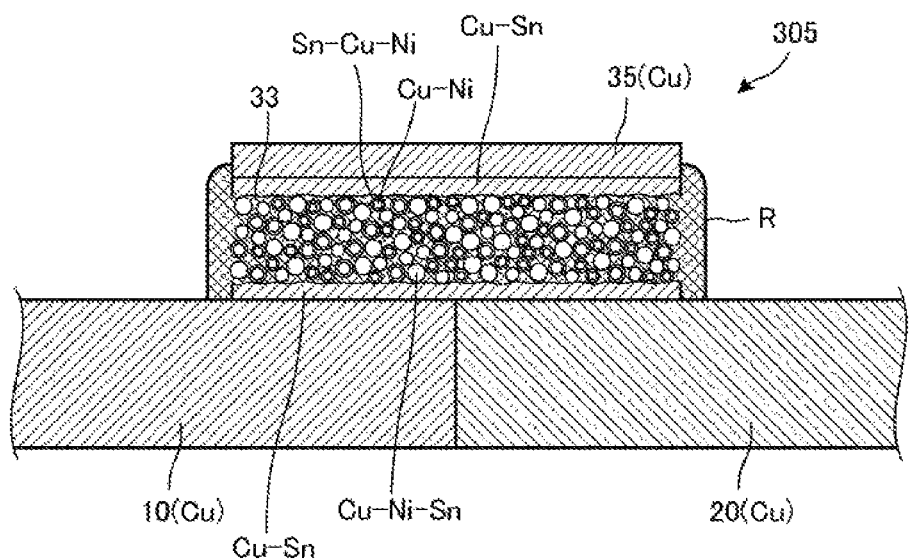
FIG. 12(B) is an enlarged sectional view of a joint portion in a state shown in FIG. 11(D).

FIG. 11(A) to FIG. 11(D) are perspective views showing a step of joining the first structural material 10 and the second structural material 20 together by a structural material joining tape 305. FIG. 12(A) is an enlarged sectional view of a joint portion in a state shown in FIG. 11(C). FIG. 12(B) is an enlarged sectional view of a joint portion in a state shown in FIG. 11(D).

Figure 13A:
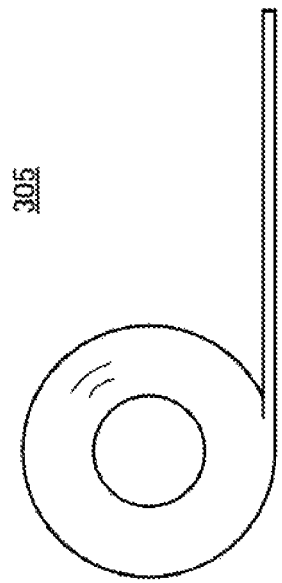
FIG. 13(A) is a perspective view of the structural material joining tape 305.
Figure 13B:
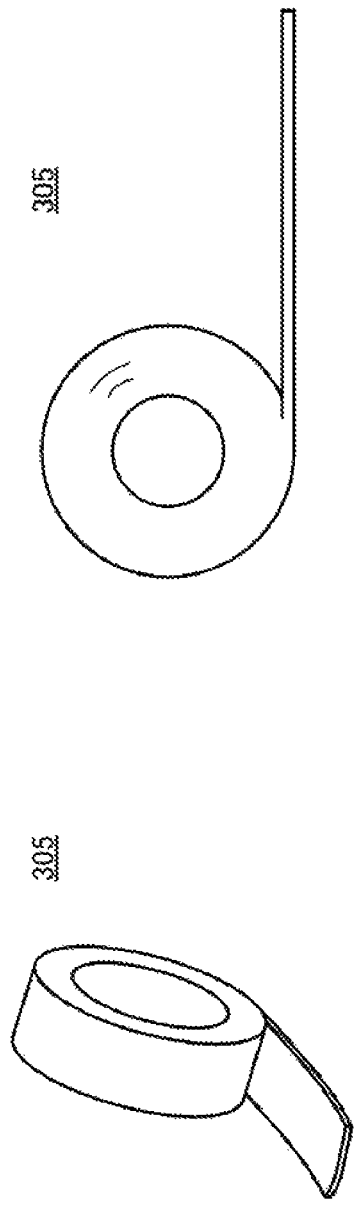
FIG. 13(B) is a front view thereof.
Figure 13C:
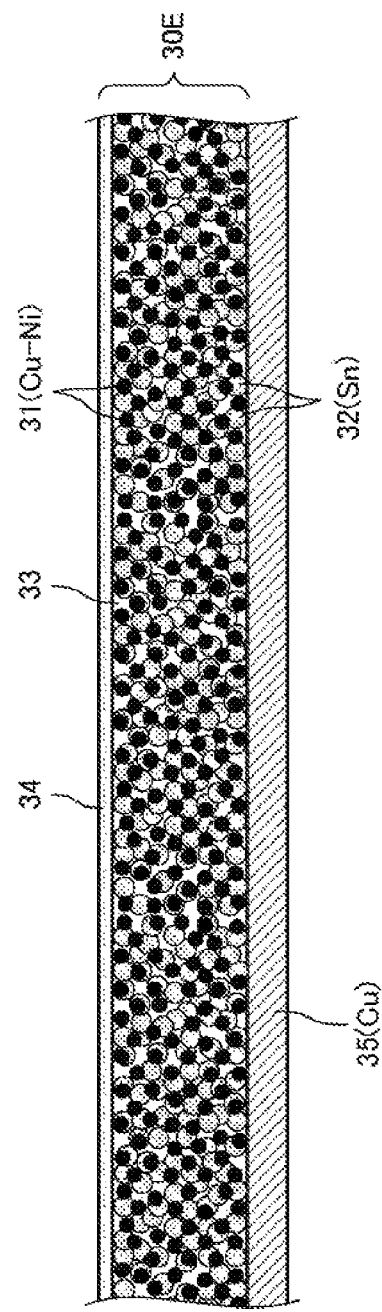
FIG. 13(C) is a partially enlarged sectional view.

FIG. 13(A) is a perspective view of the structural material joining tape 305, FIG. 13(B) is a front view thereof, and FIG. 13(C) is a partially enlarged sectional view.

As shown in FIG. 13(C), the joining tape 305 is one in which the joining material 30E is formed on a flexible substrate sheet 35. The configuration of the joining material 30E is the same as that of the joining material 30D shown in FIG. 10(B) in Fourth Embodiment.

Both of the first structural material 10 and the second structural material 20 are a Cu material. The substrate sheet 35 is also a Cu material (foil).

A method for joining structural materials together using the above-mentioned structural material joining tape 305 is as follows.

(1) As shown in FIGS. 11(A), 11(B) and 11(C) and FIG. 12(A), the first structural material 10 and the second structural material 20 are temporarily joined together by butting joint surfaces of the first structural material 10 and the second structural material 20, and bonding the structural material joining tape 305 around a butting portion.

(2) A periphery of the structural material joining tape 305 is heated with use of an industrial drier such as a heat gun to allow the Sn powder to react with the Cu—Ni alloy powder, as shown in FIG. 12(B), and thereby, a TLP bonding layer (Cu—Ni—Sn) which is a high melting point reactant, is produced. That is, an intermetallic compound layer is produced by the TLP bonding reaction, and structural materials are joined together with the intermetallic compound layer interposed between the structural materials.

The adhesive layer 34 disappears in the above-mentioned heating step or is integrated with the resin component 33.

The flux component disappears in the above-mentioned heating step. The flux component is a reducing agent, and allows an oxide films on the surfaces of the powders to dissolve to accelerate the above-mentioned reaction. In addition, it is preferred that the flux is also contained in the adhesive layer 34. Thereby, the surfaces of the first structural material 10 and the second structural material 20 can be made clean and oxide films of the powder surfaces can be removed, and therefore a more compact intermetallic compound layer can be formed, and a reaction rate is more improved.

At the micro level, as shown in FIG. 12(B), the Cu—Ni alloy powder reacts with the Sn powder to form a Cu—Sn film ($Cu_3Sn$, $Cu_6Sn_5$, etc.) on the surface of the Cu material. A Sn—Cu—Ni film is formed on the surface of the Cu—Ni alloy powder by the reaction of the Cu—Ni alloy powder with Sn. Further, a Sn—Cu alloy ($Cu_6Sn_5$, etc.) is formed by the reaction of a part of the Sn powder with Cu. Moreover, a Sn—Ni alloy ($Ni_3Sn_4$, etc.) is formed by the reaction of a part of the Sn powder with Ni.

Minute open pores are formed in the resulting intermetallic compound layer, and the resin component 33 is filled into the minute open pores. Further, the resin component softens and flows by heat treatment to exude to a lateral circumferential portion of the joint portion, and consequently the lateral circumferential portion of the intermetallic compound layer is covered with a film made of the resin component.

Since the intermetallic compound layer is thus formed, the melting point of the intermetallic compound layer changes to, for example, 400° C. or higher.

The resin component 33 is going to be extruded outward according to the TLP bonding reaction, and consequently a resin film R is formed on a lateral circumferential (exposed) portion of the intermetallic compound layer. The lateral circumferential (exposed) portion of the intermetallic compound layer is covered with the resin film R. Further, a resin component which minute open pores of the intermetallic compound layer have been filled with is combined with a resin component having exuded to the lateral circumferential portion of the intermetallic compound layer to form a robust protective film by the resin component.

In addition, in the heating steps of the embodiments described above, far-infrared heating or high-frequency induction heating may be implemented besides hot air heating.

DESCRIPTION OF REFERENCE SYMBOLS

R: Resin film
10: First structural material
11, 21: Cu-plating film
12, 22: Plating film of a Cu—Ni alloy
13, 23: Sn-plating film
20: Second structural material
30A~30E: Joining material
31: Cu—Ni alloy powder
32: Sn powder
33: Resin component
34: Adhesive layer
35: Substrate sheet
39: Release paper
301,305: Joining tape

The invention claimed is:

1. A method for joining structural materials together, the method comprising:
providing a mixed layer of a raw-material component and a resin component between a first structural material and a second structural material to form bonded structural materials;
heat-treating the bonded structural materials so that the first structural material is joined to the second structural material with an intermetallic compound layer interposed therebetween and formed from a first metal and a second metal, the second metal having a higher melting point than the first metal, and the resin component exudes and covers a lateral circumferential portion of the intermetallic compound layer,
wherein when the resin component exudes to the lateral circumferential portion of the intermetallic compound layer by the heat-treating, open pores are formed within the intermetallic compound layer, the open pores being filled with the resin component and combined with the resin component at the lateral circumferential portion of the intermetallic compound layer.

2. The method for joining structural materials together according to claim 1, wherein the raw material component includes the first metal and the second metal, the second metal is a metal powder selected from the group consisting of a Cu—Ni alloy, a Cu—Mn alloy, a Cu—Al alloy and a Cu—Cr alloy, and the first metal is a metal powder having Sn as a component or Sn as a main component thereof.

3. The method for joining structural materials together according to claim 2, wherein at least surfaces of the first structural material and the second structural material in contact with the mixed layer have Cu as a main component thereof.

4. The method for joining structural materials together according to claim 1, wherein at least surfaces of the first structural material and the second structural material in contact with the mixed layer are an alloy selected from the group consisting of a Cu—Ni alloy, a Cu—Mn alloy, a Cu—Al alloy and a Cu—Cr alloy, and the raw material component includes a metal powder having Sn as a component or Sn as a main component thereof.

5. The method for joining structural materials together according to claim 1, wherein at least surfaces of the first structural material and the second structural material in contact with the mixed layer have Sn as a component or Sn as a main component thereof, and the raw material component includes at least alloy selected from the group consisting of a Cu—Ni alloy, a Cu—Mn alloy, a Cu—Al alloy and a Cu—Cr alloy.

6. The method for joining structural materials together according to claim 1, wherein the resin component has a softening temperature of 130 to 300° C.

7. The method for joining structural materials together according to claim 6, wherein the resin component is selected from the group consisting of phenolic resin, epoxy resin, silicone resin, acrylic resin, polycarbonate resin, polyamide resin, polyimide resin, and Teflon resin.

8. The method for joining structural materials together according to claim 1, wherein the mixed layer is a sheet.

9. A joint structure comprising:
a first structural material;
a second structural material;
and a joining sheet interposed between the first and second structural materials, the joining sheet having a mixed layer of a raw-material component and a resin component that softens and flows during heat-treating such that the first structural material is joined to the second structural material with an intermetallic compound layer, and a lateral circumferential portion of the intermetallic compound layer is covered with an exudate of the resin component,
wherein the intermetallic compound layer has open pores filled with the resin component and combined with the resin component at the lateral circumferential portion of the intermetallic compound layer.

10. The joint structure according to claim 9, wherein the resin component is selected from the group consisting of phenolic resin, epoxy resin, silicone resin, acrylic resin, polycarbonate resin, polyamide resin, polyimide resin, and Teflon resin.

* * * * *